(12) United States Patent
Schwarzkopf

(10) Patent No.: US 8,026,682 B2
(45) Date of Patent: Sep. 27, 2011

(54) CIRCUIT ARRANGEMENT

(75) Inventor: Johannes Schwarzkopf, Marktheidenfeld (DE)

(73) Assignee: Brose Fahrzeugteile GmbH & Co. Kommanditgesellschaft, Würzburg, Würzburg (DE)

(*) Notice: Subject to any disclaimer, the term of this patent is extended or adjusted under 35 U.S.C. 154(b) by 253 days.

(21) Appl. No.: 12/309,591

(22) PCT Filed: Jul. 13, 2007

(86) PCT No.: PCT/EP2007/057222
§ 371 (c)(1),
(2), (4) Date: Jul. 16, 2009

(87) PCT Pub. No.: WO2008/012212
PCT Pub. Date: Jan. 31, 2008

(65) Prior Publication Data
US 2009/0302790 A1    Dec. 10, 2009

(30) Foreign Application Priority Data
Jul. 26, 2006 (DE) .................... 10 2006 034 596

(51) Int. Cl.
*H02P 1/04* (2006.01)
(52) U.S. Cl. ........... 318/400.17; 318/400.1; 318/400.13; 318/400.26; 318/400.01; 318/599; 318/700; 318/600
(58) Field of Classification Search .......... 318/400.17, 318/599, 400.01, 700, 600, 400.1, 400.13, 318/400.26
See application file for complete search history.

(56) References Cited

U.S. PATENT DOCUMENTS

| | | | | |
|---|---|---|---|---|
| 4,712,050 A | * | 12/1987 | Nagasawa et al. | 318/400.04 |
| 4,819,597 A | * | 4/1989 | Gale et al. | 123/399 |
| 5,426,355 A | * | 6/1995 | Zweighaft | 318/364 |
| 5,548,969 A | * | 8/1996 | Lee | 62/228.4 |
| 5,640,073 A | * | 6/1997 | Ikeda et al. | 318/400.03 |

(Continued)

FOREIGN PATENT DOCUMENTS
EP        1471628 A        10/2004

OTHER PUBLICATIONS

PCT Search Report & Written Opinion in corresponding PCT/EP2007/057222.

*Primary Examiner* — Rita Leykin
(74) *Attorney, Agent, or Firm* — Manelli Selter PLLC; Edward J. Stemberger

(57) ABSTRACT

The invention specifies a circuit arrangement (1, 20) for controlling a brushless electric motor (37) with a control chip (2), particularly a microcontroller, which has a number of PWM contacts (8), which can be used to output a PWM signal, and a number of commutation contacts (5,5', 6,6', 7,7'), which can be used to output a commutation signal. In this case, provision is made for at least one commutation contact (5,5', 6,6', 7,7') to be alternately controllable as an input and an output, for the at least one commutation contact (5,5', 6,6', 7,7') to have its output electrically connected to a PWM contact (8), and for the commutation contact (5,5', 6,6', 7,7') connected in this manner to be able to be contacted for the purpose of tapping off a control signal. Such a circuit arrangement (1,20) increases the control options for a given control chip (2). The number of PWM sources required is reduced.

11 Claims, 2 Drawing Sheets

U.S. PATENT DOCUMENTS

| | | | |
|---|---|---|---|
| 5,739,651 A * | 4/1998 | Miyazawa et al. | 318/400.34 |
| 5,892,347 A * | 4/1999 | Zweighaft et al. | 318/590 |
| 6,232,730 B1 | 5/2001 | Doyama et al. | |
| 6,452,349 B1 | 9/2002 | Hahn et al. | |
| 6,580,236 B2 * | 6/2003 | Mitsuda | 318/400.17 |
| 6,670,804 B1 * | 12/2003 | Glemser et al. | 324/207.16 |
| 6,771,033 B2 * | 8/2004 | Kokami et al. | 318/400.35 |
| 6,798,309 B2 * | 9/2004 | Lohr et al. | 333/24 R |
| 6,900,604 B2 * | 5/2005 | Kokami et al. | 318/400.33 |
| 7,157,889 B2 * | 1/2007 | Kernahan et al. | 323/268 |
| 7,218,072 B2 * | 5/2007 | Sugiura et al. | 318/400.11 |
| 7,296,923 B1 * | 11/2007 | Malasky et al. | 366/208 |
| 2004/0012353 A1 | 1/2004 | Seima et al. | |
| 2006/0071621 A1 | 4/2006 | Sugiura et al. | |

* cited by examiner

CIRCUIT ARRANGEMENT

FIELD OF THE INVENTION

The invention relates to a circuit arrangement for controlling a brushless electric motor, comprising a control component, in particular a microcontroller, which has a number of PWM contacts, via which a PWM signal can be output, and a number of commutation contacts, via which a commutation signal can be output.

BACKGROUND OF THE INVENTION

The output signals generated by a circuit arrangement of this type are used for controlling a brushless electric motor. Such an electric motor has a number of winding phases or phases that are usually arranged along the circumferential direction of a stator. A rotating magnetic field is generated by means of controlled energization of the winding phases, said field driving a rotor, which generally has permanent magnets. Electric motors comprising three winding phases which are arranged in a star connection and can thus be energized via three motor terminals are known, in particular. The characteristic variables of the electric motor, such as, in particular, rotational speed and torque, can be controlled by way of the frequency, phase, intensity and duration of the winding currents, which are controlled by way of the voltages applied to the winding phases.

The duration of the energization for each individual winding phase or the duration of a corresponding voltage supply, for example for each individual motor terminal, is coded by means of the commutation signal. The commutation signal can be introduced into a control in such a way that an energization of the assigned winding phase or a voltage supply of the assigned motor terminal can be effected only given a corresponding level of the signal. In the case of a digital commutation signal, the two levels HIGH or LOW are used for this purpose.

The PWM signal is used for the variation of the voltage present at the respective winding phase during the energization or commutation phase, or for the variation of the potential present at the assigned motor terminal. In this case, a PWM or Pulse Width Modulation signal prescribes the switch-on and switch-off time of a rectangular signal with a fixed fundamental frequency. In this case, for a sluggish load, the voltage present on average can be varied by way of the duration of the switch-on time of the rectangular signal within a PWM clock cycle. If the rectangular signal is switched on for example for only half of the total available time, then the load sees on average only half of the voltage present during the switch-on time.

In a conventional circuitry interconnection, for the driving of the respective winding phases or motor terminals of a brushless electric motor, the PWM signal is logically combined with the commutation signal by means of a logic component in the manner of a gate circuit. If an OR gate, for example, is used as the logic component, then a signal which corresponds to the PWM signal when the commutation signal is simultaneously at the level LOW is available at the output of the OR gate for control purposes. The assigned motor terminal is supplied with a PWM-clocked voltage signal according to the output signal. If the commutation signal is switched to the level HIGH, then the output signal of the OR gate is at the level HIGH in constant fashion. The motor terminal is supplied with a constant voltage signal, in particular is pulled to ground or to a low reference potential. The situation is correspondingly reversed in the case where an AND gate is used as the logic component.

Such a circuit arrangement in accordance with the prior art makes it possible to use, for the driving of a brushless electric motor, a cost-effective control component having a small number of PWM contacts or just one PWM contact. The PWM signal of a single PWM contact is used by means of corresponding logic components for the modulation of a plurality of commutation signals.

The degrees of freedom with regard to the possibilities for driving the electric motor are disadvantageously restricted by such a circuitry interconnection. If the driving of the electric motor takes place for example by means of a converter which is fed by an intermediate circuit and which has a number of controllable switching elements for the clocked changeover between the two potentials of the intermediate circuit, then for a winding phase the so-called HIGHSIDE switching element, that is to say that switching element which switches the motor feed line to the high potential of the intermediate circuit, cannot be driven independently of the LOWSIDE switching element, which switches the motor feed line to the low potential of the intermediate circuit. This is because only a single PWM signal is available for both switching elements. It is likewise not possible to drive individual winding phases independently in the case of an overlap of the commutation phases of said individual winding phases if only one PWM signal is available.

SUMMARY OF THE INVENTION

It is an object of the invention to configure a circuit arrangement of the type mentioned in the introduction in such a way that the number of control possibilities is increased by comparison with a configuration in accordance with the prior art given the same number of PWM contacts.

This is achieved, for a circuit arrangement in accordance with the preamble of patent claim 1, according to the invention in that at least one commutation contact is alternately controllable as input and output, in that the at least one commutation contact is electrically connected to a PWM contact on the output side, and in that the commutation contact connected in this way can be contact-connected for the purpose of tapping off a control signal.

In this case, the invention is based, in a first step, on the consideration that many control components and in particular microcontrollers have contacts which can be configured alternately both as input and as output. If the respective contact is configured as an output, then the output signal is predominant in the feed line. A possibly different signal in the feed line is pulled to the level of the contact. Consequently, the output signal respectively output by the control component can be tapped off via a correspondingly contact-connected feed line. If the corresponding contact is configured as an input, then a signal possibly contained in the connecting line is predominant. In other words, the signal is predominant in the feed line.

In a second step, the invention is based on the consideration that the setting of the signal level in a feed line depending on the configuration of the connected contact as input or as output is suitable for generating a control signal for the brushless electric motor. By means of the alternate configuration as input or as output, a total of three possibilities are available here for a digital control signal. In the case of a configuration of the contact as output, it becomes possible to pull a signal in the feed line either to the level HIGH or the level LOW according to the respective output signal of the contact. By contrast, if the contact is configured as input, then the signal present via the connecting line is not influenced by the contact.

In a third step, finally, the invention recognizes that it is possible to realize the necessary control signal for a winding phase of the brushless electric motor by means of a commutation signal and a PWM signal with an increase in the control possibilities by virtue of the fact that the PWM contact is electrically connected to the corresponding commutation contact which is alternately controllable as input and output. The control signal that can be tapped off via a connecting line with the PWM contact then has either the level HIGH or the level LOW in the case of a configuration of the commutation contact as output. In the case of a configuration of the commutation contact as input, by contrast, the PWM signal is predominant in the line present. In contrast to a previous circuit arrangement in which the commutation contact is always defined as output, therefore, a control signal that is permanently at the level LOW or at the level HIGH can be generated independently of the PWM signal. A permanent level LOW of the control signal independently of the PWM signal is not possible in the case of a conventional circuit arrangement with an ORing between PWM signal and commutation signal. In the case of a conventional circuit arrangement with an ANDing, in turn, it is not possible to achieve a permanent setting of the control signal to the level HIGH.

Consequently, the invention affords the advantage over a conventional circuit arrangement in accordance with the prior art of further circuit possibilities without the number of PWM contacts of the control component having to be increased. In particular, there is no need to have recourse to an expensive control component having a plurality of PWM contacts. Consequently, control of a brushless electric motor with higher functionality is realized without any increase in costs. The invention is suitable, in principle, for driving any brushless electric motor. In particular, the invention is suitable for driving fan motors such as are employed in automotive engineering, for example.

The invention is not restricted to the circumstance that necessarily all of the commutation contacts which are used for driving a respective motor terminal or a respective winding phase are alternately controllable as input and output. In order to increase the degrees of freedom in the driving, it suffices to choose one of the commutation contacts to be controllable in this way. The invention does not require the use of a particular control component. This is because the control components generally used for driving a brushless electric motor have the functionality of configuring the contacts alternately as input or as output.

Expediently, the at least one commutation contact which can alternately be configured as input or as output is connected to the PWM contact via a resistor. It is thereby possible to avoid a current flow—possibly harmful for the control component—between the contacts. In the case of the conventional control components, it is recommended to use a resistor having a resistance of the order of magnitude of a few tens of kilohms [kΩ].

In one advantageous configuration of the invention, all the commutation contacts are configured such that they are alternately controllable as inputs and outputs and are electrically connected to a PWM contact. With this configuration, the number of driving possibilities is increased for each commutation signal and thus for each winding phase of the electric motor that is to be energized. It goes without saying that a plurality of PWM contacts each electrically connected to the assigned commutation contacts can also be used for this purpose.

In a particularly favorable variant of the invention, all the commutation contacts are alternately controllable as inputs and outputs and are in each case connected to a single PWM contact. This makes it possible, with a favorable control component having only a single PWM contact, to drive motor terminals or the winding phases of a brushless electric motor with an improved functionality by comparison with a conventional circuit arrangement.

In a further advantageous configuration of the invention, a PWM contact is connected to a reference potential, in particular ground, via a series circuit formed by a resistor and a capacitance, wherein a further contact of the control component, said further contact being controllable as input and as output, is connected between the resistor and the capacitance, and wherein a voltage signal can be tapped off between resistor and capacitance.

Such an additional circuitry interconnection of the PWM contact makes it possible to generate an analog comparison voltage without using a digital/analog converter. For this purpose, the commutation contacts connected to the PWM contact are in each case configured as inputs. If the further contact which can be controlled as input and as output is defined as input, then an analog voltage can be tapped off between resistor and capacitance, the magnitude of which voltage can be set by means of the PWM clocking. In this case, the further contact which can be controlled as input and as output acts to an extent as a switch. If it is configured as output, then a permanent signal either at the level HIGH or at the level LOW arises as output signal. A finely stepped setting of the analog voltage is made possible by the use of the PWM signal. The comparison voltage can be generated for example if there are independent operating ranges of the electric motor in which the PWM signal is not required for controlling the energization. This is the case for example in energization gaps or in the case of permanent energization of a winding phase.

For the driving of an electric motor, the commutation contacts are expediently connected via a driver component to an in particular PWM-controllable converter fed by a DC voltage circuit or intermediate circuit. In this case, the driver component transfers the control signals of the control component into corresponding power signals that drive the switching elements of the converter.

As a PWM converter, the latter has in particular for a motor feed line in each case two controllable switching elements, such as, for example, MOSFETs or IGBTs, which are connected in series between the feed line and the return line of the DC voltage intermediate circuit, wherein the switching elements are in each case linked to the control signals, in particular to the commutation contacts, via a control line of the driver component.

Since, in the case of a conventional circuit arrangement in accordance with the prior art—as mentioned in the introduction—the HIGHSIDE switching elements of the converter cannot be controlled independently of the LOWSIDE switching elements, usually only the respective HIGHSIDE switching element is PWM-clocked, while the LOWSIDE switching element is either open or closed. Such a circuitry interconnection or driving leads to a non-uniform power loss, however. Thus, switching losses predominate in the HIGHSIDE switching elements and line losses in the LOWSIDE switching elements. If, by contrast, both switching elements are PWM-clocked, which is made possible by the novel circuit arrangement described above, then the power loss is distributed uniformly. The maximum loading thus decreases in PWM operation.

In particular, the invention permits commutation states which have not been able to be driven heretofore. By way of example, when using a control component with only one PWM contact, it has not been possible hitherto to switch one motor terminal to the feed line of the intermediate circuit and one motor terminal to the return line of the intermediate circuit and also to drive a further motor terminal for example with a duty ratio of 90% of the voltage of the intermediate circuit.

The invention furthermore affords the possibility, for achieving a predetermined voltage between the motor terminals, of driving the corresponding HIGHSIDE switching element with a duty ratio of 100% and the corresponding LOWSIDE switching element with a desired duty ratio by using the PWM signal. Whereas in the case of a predetermined circuitry interconnection of the conventional type, wherein for example only the HIGHSIDE switching element was driven, in order to achieve a voltage between two motor terminals of 60% of the voltage of the intermediate circuit the HIGHSIDE switching element had to be PWM-clocked with a duty ratio of 60%, while a LOWSIDE switching element was permanently open, it is optionally also possible, by means of the invention, to operate the HIGHSIDE switching element with a duty ratio of 100% (control signal has the level HIGH) and the LOWSIDE switching element with a duty ratio of 40% in a PWM-controlled manner. For the electric motor driven in this way, the resultant potential shift does not become apparent since the motor current and thus the power are driven solely by the potential difference between the motor terminals, which remains the same in both cases. However—as mentioned above—the power loss of the motor control is balanced with regard to line and switching losses by means of the changed control. Consequently, more cost-effective components such as power semiconductors or diodes can be used or their service life is increased by virtue of the respective reduced loading.

The invention can furthermore be used to perform a position determination in the electric motor for the regulation or control thereof. Specifically, if the electric motor, for achieving high rotational speeds, is operated in such a way that the block commutation leads the electromotive force (EMF for short), that is to say the voltage induced in the winding phases, then a position determination can no longer be determined by detecting the zero crossing of the EMF. This is because the energization of the corresponding winding phase already starts at the instant of the zero crossing of the EMF, such that the induced voltage as such can no longer be detected. In order nevertheless to be able to perform a position determination, the EMF is to be measured at a point not equal to the zero crossing. For this purpose, it is necessary to use a comparison voltage which is compared with the measured voltage value of the EMF by means of a comparator. This voltage can be generated by means of the PWM contact of the control component—as described above—by the PWM signal being conducted to an RC element. In this case, the comparison voltage results from the predetermined duty ratio of the PWM signal.

Since, at high rotational speed, the duty ratio is 100% during the block commutation, the respective commutation contact of the control component can be configured as output during this time. This permits the PWM signal to be used for generating the comparison signal and a position determination to be performed, by means of the comparison signal, by measurement of the value of the EMF. A digital/analog converter can be dispensed with.

BRIEF DESCRIPTION OF THE DRAWINGS

Exemplary embodiments of the invention will be explained in more detail with reference to the drawing, in which.

DESCRIPTION OF THE PREFERRED EMBODIMENTS

Figure 1:
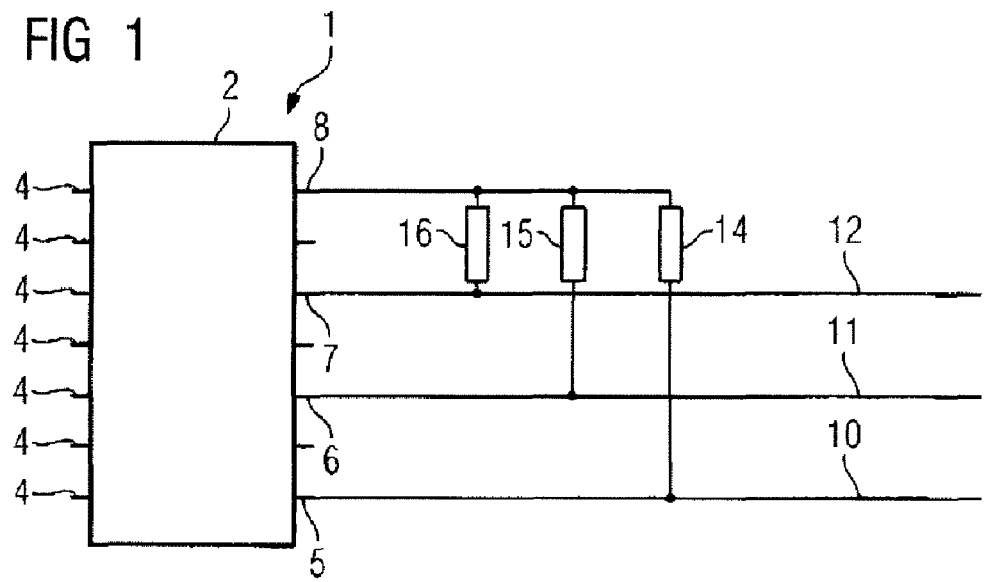
FIG. 1 shows a circuit arrangement in which a PWM contact is connected to commutation contacts via resistors in each case.

FIG. 1 shows a circuit arrangement 1 for driving a brushless electric motor (not illustrated). In this case, the circuit arrangement 1 has a control component 2 fashioned as a microcontroller containing a number of configurable contacts 4. At least some of said contacts 4 can alternately be configured as input and as output.

For the driving of the electric motor, the control component 2 has in particular three commutation contacts 5, 6 and 7, which can likewise in each case be configured both as inputs and as outputs. The three commutation contacts 5, 6 and 7 generate a respective commutation signal which can be used for controlling the voltage supply of a respective motor terminal of a bipolar three-phase electric motor. The output signals of the three commutation contacts 5, 6, 7 can be used in particular for driving the respective HIGHSIDE switching elements of a converter fed by an intermediate circuit.

The control component 2 furthermore has a PWM contact 8, which serves a configurable PWM signal for the PWM clocking of the driven switching elements. The potential respectively present at the motor terminals is varied by the PWM clocking with a corresponding duty ratio, whereby ultimately the phase voltage respectively dropped across the winding phases of the electric motor and thus the phase energization are set.

In order to use the PWM signal of the single PWM contact 8, the latter is electrically contact-connected to the commutation contacts 5, 6 and 7 respectively via the resistors 14, 15, 16. The resultant control signals for the switching elements of the converter can be tapped off via the connecting lines 10, 11 and 12.

With one digital commutation signal and one digital PWM signal, therefore, three states can be generated for each control signal in the connecting lines 10, 11 and 12. Thus, a control signal having a level of HIGH or of LOW is generated without the use of the PWM signal by configuration of the respective commutation contact 5, 6 or 7. The commutation output is predominant. By contrast, if the respective commutation contact 5, 6 or 7 is configured as input, then the PWM signal that is output is predominant, such that the corresponding switching element of the converter can be PWM-clocked.

Figure 2:
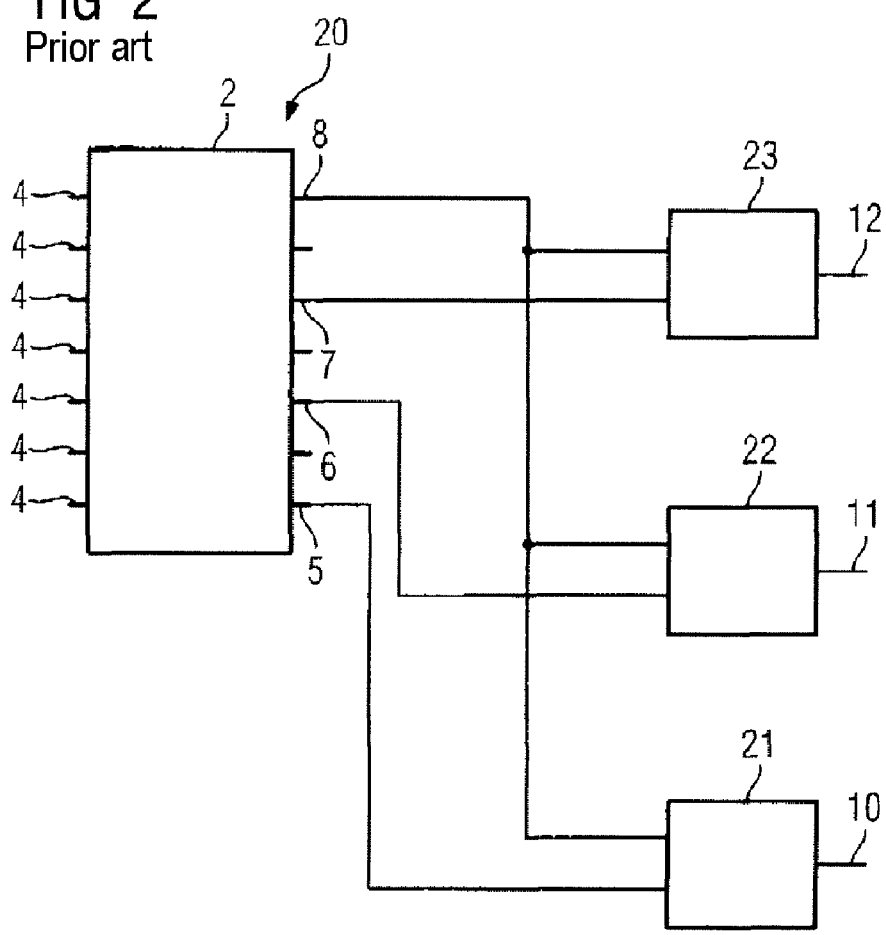
FIG. 2 shows a circuit arrangement in accordance with the prior art.

FIG. 2 illustrates by comparison therewith a circuit arrangement 20 in accordance with the prior art. In this case, the circuit arrangement 20 in accordance with FIG. 2 comprises the same control component 2 as the circuit arrangement 1 in accordance with FIG. 1. However, the alternate configurability of the contacts 4 and/or of the contacts 5, 6 and 7 as inputs and as outputs is not taken into account in this case for driving purposes. Instead, the control signal that can be tapped off for the switching elements via the connecting lines 10, 11 and 12 is generated by a logical combination between the PWM signal of the PWM contact 8 and the respective commutation signals of the commutation contacts 5, 6 and 7. For this purpose, the PWM signal and the respective commutation signals are logically combined via a respective logic component 21, 22 and 23. In this case, each of the logic components 21, 22 and 23 is an OR gate.

If the commutation signal of the respective commutation contacts 5, 6 and 7 is at the level LOW, then the respective control signal corresponds to the PWM signal of the PWM contact 8. If the commutation signal is at the level HIGH, then the respective control signal is likewise pulled to the level HIGH. Permanent generation of a control signal having the level LOW is not possible.

In order therefore to be able to drive a bipolar three-phase electric motor, the HIGHSIDE switching elements of a converter are supplied by means of control signals from the connecting lines 10, 11 and 12 as illustrated, which are logically combined with the PWM signal by means of an OR gate. The respective LOWSIDE switching elements of the converter are correspondingly generated by logical combination of further commutation signals with the PWM signal with the aid of an AND gate.

It can be seen that the circuit arrangement 1 in accordance with FIG. 1 affords more possibilities for driving the electric motor than the circuit arrangement 20 in accordance with FIG. 2.

Figure 3:
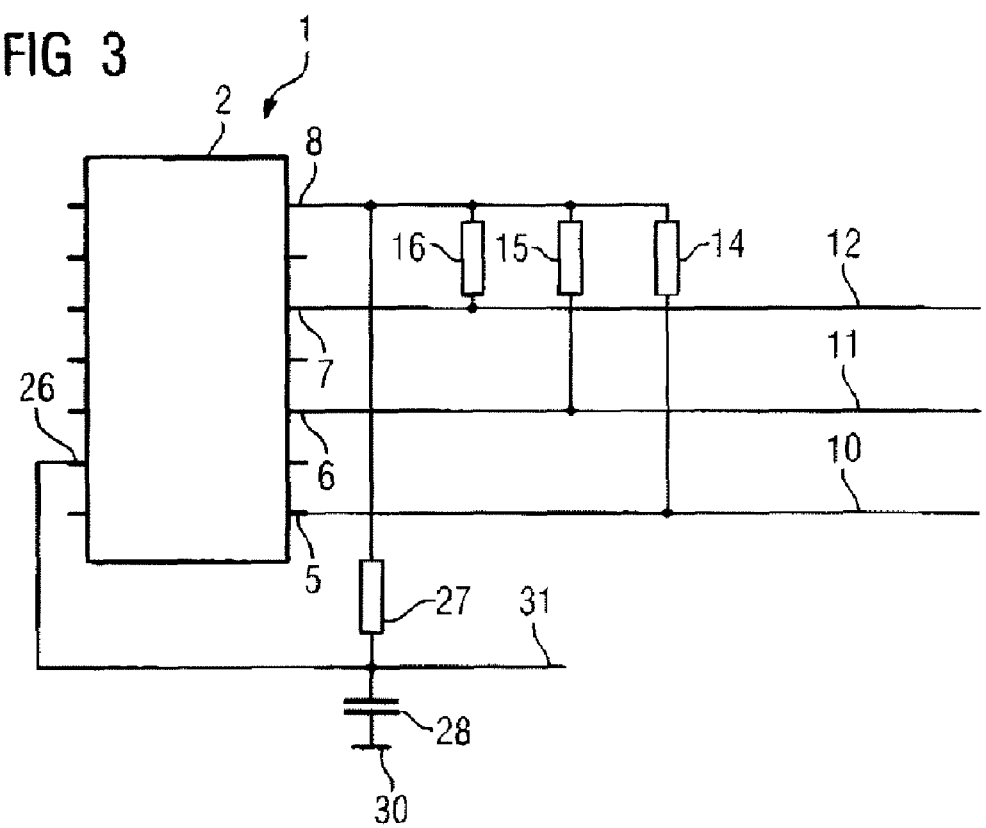
FIG. 3 shows a circuit arrangement in accordance with FIG. 1, wherein the PWM contact is additionally connected to an RC element.

FIG. 3 illustrates a circuit arrangement 1 in accordance with FIG. 1, wherein the PWM contact 8 is additionally contact-connected to an RC element. In this case, the RC element comprises a resistor 27 connected in series with a capacitor or a capacitance 28. The capacitance 28 is connected to ground 30.

If the commutation outputs 5, 6 and 7 are each defined as inputs, then an analog voltage can be tapped off at the RC element via the connecting line 31. The magnitude of said voltage being dependent on the duty ratio of the PWM signal that is generated at the PWM contact 8.

The analog voltage generated can be switched on and off via the further contact 26, which can likewise alternately be configured as input and as output. If the contact 26 is defined as output, then either the level HIGH or the level LOW can be tapped off via the connecting line 31. By contrast, the analog voltage generated can be tapped off in the case of a configuration of the contact 26 as input.

The analog voltage generated in this way by means of PWM clocking with the use of the PWM contact 8 is used in particular—as already mentioned—for the position determination of the electric motor by measurement of the induced voltage generated in the winding phases. In particular, this is the case if, at high rotational speeds, the respective switching elements of the converter are driven without PWM clocking and the block commutation leads the EMF. The EMF is then measured in the current gaps of the block commutation at a point outside the zero crossing by the value of the induced voltage being compared with the comparison voltage generated.

Figure 4:
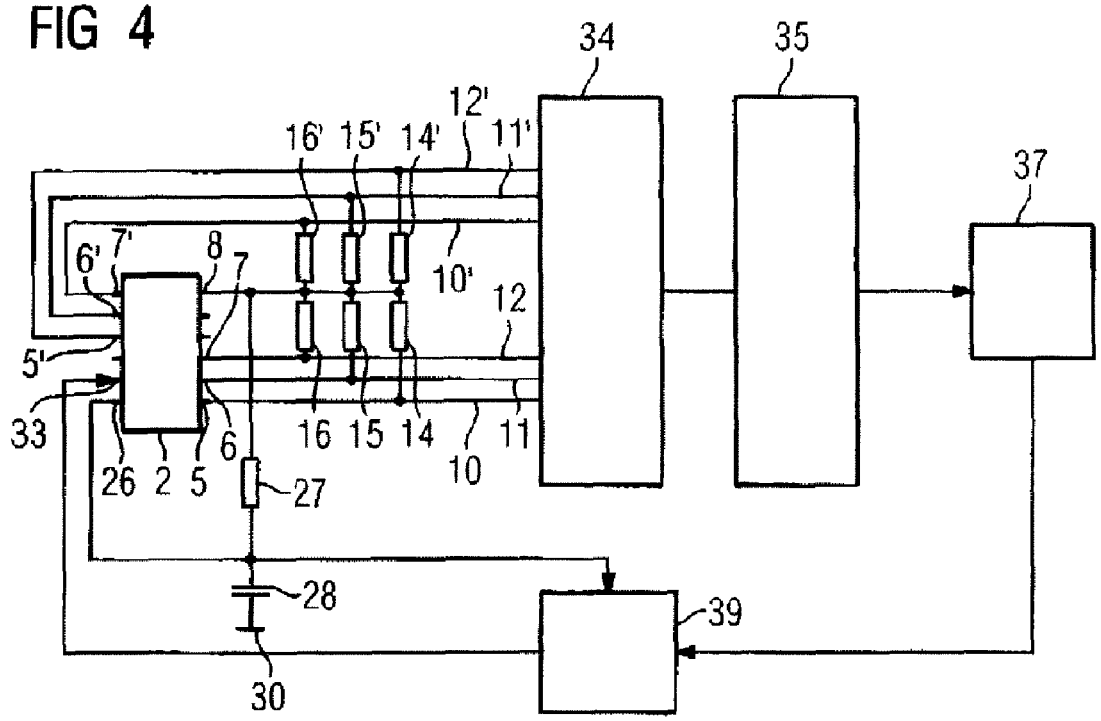
FIG. 4 shows a circuit arrangement analogous to FIG. 3, which is connected to a driver component for driving an electric motor by means of a converter.

FIG. 4 shows the control component 2, the control signals of which are converted by means of a driver component 34 for the driving of the switching elements of a converter 35 and are therefore used for driving an electric motor 37.

The commutation contacts 5, 6 and 7 and also the PWM contact 8 of the control component 2 can be seen, as in FIGS. 1 and 3. The commutation contacts 5, 6 and 7 are used for driving the HIGHSIDE switching elements of the converter 35. For this purpose, the commutation contacts 5, 6 and 7 are electrically connected to the PWM contact 8 respectively via the resistors 14, 15 and 16.

The driver component 2 furthermore has additional commutation contacts 5', 6' and 7', which are used for driving the LOWSIDE switching elements of the converter 35. In order to generate the corresponding control signal for the LOWSIDE switching elements of the converter 35, the commutation contacts 5', 6' and 7' are likewise electrically connected to the PWM contact 8 of the control component 2 via the resistors 14', 15' and 16'.

The electric motor 37 is a bipolar three-phase electric motor comprising three winding phases which are star-connected. The resultant three motor terminals can in each case be switched via the HIGHSIDE and LOWSIDE switching elements of the converter 35 alternately with the high and the low potential of an intermediate circuit via which the converter 35 is fed. Consequently, by means of corresponding circuitry interconnection of the switching elements, the energization of the winding phases is made possible in such a way that a rotating magnetic field is built up which drives a rotor with permanent magnet.

The driver component 2 in accordance with FIG. 4 is configured in such a way that both the HIGHSIDE and the LOWSIDE switching elements of the converter 35 are PWM-clocked for the control of the electric motor 37. The circuit arrangement in accordance with FIG. 4 affords the possibility of driving the electric motor 37 differently depending on the operating range respectively desired. Thus, it is also possible, of course, to drive only the HIGHSIDE switching elements by PWM clocking, while the LOWSIDE switching elements are merely opened or closed. This operating range is necessary, for example, since an operating range with alternate clocking of the HIGHSIDE and LOWSIDE switching elements is not permissible in the case where a bootstrap circuit is used. It goes without saying that it is also possible to drive only the LOWSIDE switching elements by PWM clocking in the case of a forbidden operating range for the clocking of the HIGHSIDE switching elements.

The loading of the switching elements and, if appropriate, capacitors is highest and the electromagnetic compatibility is worst if the duty ratio of the PWM signal is almost 100%. Instead of commutating in constant fashion with a duty ratio of 95%, for example, the electric motor 37 can also be driven in such a way that a change is made between PWM operation (with a duty ratio of e.g. 90%) and non-PWM operation. A uniform power loss division can be achieved here, too, by clocking only the HIGHSIDE or only the LOWSIDE switching elements alternately during a cycle.

Finally, it is also possible to drive the electric motor 37 in such a way that considered altogether at the same time winding phases are connected to the feed line and winding phases are connected to the return line of the converter and winding phases are PWM-clocked. In this case, the PWM operation does not have to be at the beginning of a commutation block. It is thereby possible to have a favorable influence on the electromagnetic compatibility, the current ripple or the efficiency, for example.

Finally, it is also possible to implement an operating range by the PWM signal no longer being used for the commutation. In this case, the individual switching elements of the converter are either switched on or switched off. In this case, the PWM signal can be used for other purposes, such as, in particular, for generating an analog comparison voltage signal. The RC element, comprising the resistor 27 and the capacitance 28, is provided for this purpose. The comparison voltage that can be tapped off at the RC element is switched on and off via the contact 26. The comparison voltage is available to the position identification system 39, which uses the value of the generated comparison voltage for the measurement of the induced voltage generated in the winding phases. In this case, the point in time of the measurement can be influenced by way of the magnitude of the comparison voltage. Consequently, the induced voltage can also be determined at points outside the zero crossing which becomes necessary when a positive triggering angle is set.

The output signal of the position identification system is in turn forwarded to the control component 2, such that the electric motor can be driven in phase-conforming fashion.

The invention claimed is:

1. A circuit arrangement for controlling a brushless electric motor, comprising a control component, which comprises a number of PWM contacts, via which a PWM signal can be output, and a number of commutation contacts, via which a commutation signal can be output,
- wherein at least one commutation contact is alternately controllable as input and output,
- wherein the at least one commutation contact is electrically connected to a PWM contact on the output side, and
- wherein the commutation contact connected in this way can be contact-connected for the purpose of tapping off a control signal.

2. The circuit arrangement of claim 1,
wherein the at least one commutation contact is electrically connected to the PWM contact via a resistor.

3. The circuit arrangement of claim 2,
wherein all commutation contacts are alternately controllable as inputs and outputs and are electrically connected to a PWM contact.

4. The circuit arrangement of claim 3,
wherein an individual PWM contact is present, to which the commutation contacts are in each case connected.

5. The circuit arrangement of claim 1,
wherein all commutation contacts are alternately controllable as inputs and outputs and are electrically connected to a PWM contact.

6. The circuit arrangement of claim 5,
wherein an individual PWM contact is present, to which the commutation contacts are in each case connected.

7. The circuit arrangement of claim 1,
wherein a PWM contact is connected to a reference potential or ground via a series circuit formed by a resistor and a capacitance,
wherein a further contact of the control component is connected between the resistor and the capacitance, said further contact being controllable as input and as output, and
wherein a voltage signal can be tapped off between resistor and capacitance.

8. The circuit arrangement of claim 1,
wherein the commutation contacts are connected via a driver component to a converter fed by an intermediate circuit.

9. The circuit arrangement of claim 8,
wherein the converter comprises for a motor feed line in each case two controllable switching elements, which are connected in series between the feed line and the return line of the intermediate circuit, and
wherein the switching elements are in each case linked to the control signals via a control line of the driver component.

10. The circuit arrangement of claim 9,
wherein the switching elements are MOSFETs or IGBTs.

11. The circuit arrangement of claim 1,
wherein the control component is a microcontroller.

* * * * *